(12) United States Patent
Smith

(10) Patent No.: US 9,869,338 B2
(45) Date of Patent: Jan. 16, 2018

(54) REUSABLE CLAMP DEVICE

(71) Applicant: Cleva Smith, Lexington, KY (US)

(72) Inventor: Cleva Smith, Lexington, KY (US)

( * ) Notice: Subject to any disclaimer, the term of this patent is extended or adjusted under 35 U.S.C. 154(b) by 7 days.

(21) Appl. No.: 14/883,039

(22) Filed: Oct. 14, 2015

(65) Prior Publication Data

US 2017/0107032 A1    Apr. 20, 2017

(51) Int. Cl.
*F16B 35/00*    (2006.01)
*B65D 63/10*    (2006.01)
*F16L 33/08*    (2006.01)
*H02G 3/32*    (2006.01)

(52) U.S. Cl.
CPC .......... *F16B 35/00* (2013.01); *B65D 63/1027* (2013.01); *F16L 33/085* (2013.01); *H02G 3/32* (2013.01); *B65D 2563/107* (2013.01); *Y02W 30/807* (2015.05)

(58) Field of Classification Search
CPC ........ F16B 21/16; F16B 35/00; F16B 35/005; F16L 3/137; F16L 3/14; F16L 3/233; F16L 3/2334; F16L 3/2336; F16L 3/2338; B65D 63/1018; B65D 2563/107
USPC ........ 411/393, 432, 511–512, 999; 248/74.1, 248/74.3
See application file for complete search history.

(56) References Cited

U.S. PATENT DOCUMENTS

| 2,632,217 | A | * | 3/1953 | Flora | F16L 3/233 24/16 PB |
| 2,692,413 | A | * | 10/1954 | Flora | F16L 3/233 24/16 R |
| 2,915,268 | A | * | 12/1959 | Wrobel | F16L 3/233 24/16 PB |
| 2,936,980 | A | * | 5/1960 | Rapata | F16L 3/12 24/16 PB |
| 3,147,523 | A | * | 9/1964 | Logan | F16L 3/233 24/11 M |
| 3,269,680 | A | * | 8/1966 | Bryant | F16L 3/1236 24/339 |
| 3,552,696 | A | * | 1/1971 | Orenick | F16L 3/233 248/71 |
| 4,073,513 | A | * | 2/1978 | Blakeley | F16L 41/12 285/136.1 |
| 4,570,303 | A | * | 2/1986 | Richmond | F16B 21/071 24/16 PB |
| 5,277,095 | A | * | 1/1994 | Steinberger | G10D 3/14 84/304 |
| 6,497,393 | B1 | * | 12/2002 | Crosslen | A47F 7/024 24/16 PB |
| 7,360,744 | B2 | * | 4/2008 | Kwilosz | F16L 3/137 248/68.1 |
| 8,258,387 | B2 | * | 9/2012 | Goodman | G10D 3/10 84/297 R |
| 2005/0051676 | A1 | * | 3/2005 | Del Sordo | H02G 3/30 248/74.3 |
| 2007/0141970 | A1 | * | 6/2007 | MacKay | B24B 45/006 451/510 |

(Continued)

*Primary Examiner* — Roberta S Delisle

(74) *Attorney, Agent, or Firm* — King & Schickli, PLLC

(57) ABSTRACT

A clamping device having a cylinder and a screw. The screw is configured to be fastened into the cylinder such that the screw may be tightened, removed and reused. The device may also include a loop associated with the cylinder that wraps around the item to be clamped and is insertable into the cylinder.

14 Claims, 8 Drawing Sheets

(56) References Cited

U.S. PATENT DOCUMENTS

2010/0314519 A1\* 12/2010 Watt ................. F16L 3/233
                                              248/274.1
2014/0123442 A1\* 5/2014 Takagi ............... F16L 33/02
                                                24/279

\* cited by examiner

REUSABLE CLAMP DEVICE

TECHNICAL FIELD

This disclosure relates generally to clamping devices and, more particularly, to a cost-efficient clamp incorporating a screw within a plastic cylinder such that the clamp may be easily tightened, removed and reused.

BACKGROUND

A cable tie, wire tie or zip tie is a common type of fastener for holding items together, such as electric cables and wires. Typically, a cable tie includes a sturdy nylon tape with an integrated gear rack and a ratchet on one end within a small open case. Once the tip of the cable tie is pulled through the case and past the ratchet, it cannot be pulled back. Instead, it may only be tightened.

Due to their low cost and ease of use, cable ties are popular for a variety of different uses, such as law enforcement, medical environments and other industrial applications. Although cable ties are relatively easy to use, they suffer from a significant disadvantage. They are typically designed as single-use devices as they must be cut off rather than loosened and reused. For example, cable ties are often used to erect temporary barriers or displays and several ties may be used. However, once erected, it may be determined that the display or barrier needs to be moved or it is not properly positioned, so the wire tires must be cut to take down the barrier or display and then new cable ties must be used, which is both costly and inefficient.

Another common type of fastening device is a hose clamp or hose clip, which is a device that serves various uses, including attaching and sealing a hose onto a fitting in a substantially permanent manner. Although hose clamps may serve a useful purpose in tightening around something, they also suffer from certain disadvantages. For example, they are not particularly aesthetically pleasing, they take a significant amount of time to use and they rust after a period of time and, thus, have to cut or broken off and replaced.

Accordingly, there is a need for a more aesthetically pleasing device for use in a number of applications, including clamping and binding either in a temporary or permanent manner. The device should act as a clamp and may be easily tightened, removed and reused.

SUMMARY

In accordance with one aspect of the disclosure, a clamping device is disclosed. The clamping device includes a cylinder and a screw. The screw is configured to be fastened into the cylinder such that said screw may be tightened and loosened for re-use. In one embodiment, the cylinder may be plastic and may have a threaded interior portion and an opening, such as a slot.

In another embodiment, the clamping device may also include a loop made of a plastic material, which is configured to wrap around the cylinder. The plastic loop may be 0.125 inches thick. The loop has two opposite ends wherein one of the two opposite ends is tapered. One of the two opposite ends is connected to the cylinder, while the tapered end of the loop is configured to be insertable into the opening of the cylinder. In addition, the screw may be a hex head screw or, in more detail, a recessed hex head screw.

In yet another aspect of the disclosure, a reusable fastening or binding device is disclosed. The device includes a plastic cylinder having a threaded interior portion and a slot positioned on an exterior portion. The device further includes a hex head screw for threading within the plastic cylinder. Finally, the device includes a loop having a first end connected to the plastic cylinder and a second end for inserting into the slot.

Another related aspect of this disclosure is a method of clamping or fastening an item. The method includes: (1) providing a recessed hex head screw; (2) providing a plastic cylinder including slot and an associated loop; (3) inserting the recessed hex head screw into the plastic cylinder; and (4) tightening the recessed hex head screw. In one embodiment, the method further comprises wrapping the associated loop around the item and inserting one end of the associated loop into the slot on the cylinder. In addition, the method may include loosening the recessed hex head screw such that said recessed hex head screw and the plastic cylinder may be removed from the item and reused.

BRIEF DESCRIPTION OF THE DRAWINGS

The accompanying drawings incorporated in and forming a part of the specification, illustrate several aspects of this disclosure, and together with the description serve to explain the principles of the disclosure. In the drawings.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the embodiments and like numerals represent like details in the various figures. Also, it is to be understood that other embodiments may be utilized and that process or other changes may be made without departing from the scope of the disclosure. The following detailed description is not to be taken in a limiting sense, and the scope of the invention is defined only by the appended claims and their equivalents. In accordance with the disclosure, a reusable clamping device is hereinafter described.

As shown in FIGS. 1-8, the reusable clamping device 10 is illustrated. The reusable clamping device 10 may be made in multiple sizes to accommodate nearly any size application. One of the primary uses of the reusable clamping device 10 is to provide a more aesthetically pleasing alternative to metal hose clamps. For example, the reusable clamping device 10 may be used on a machine missing a metal collar, which is used to prevent a shaft sliding when in use. The reusable clamping device 10 may be used to be clamped or fastened to the machine to prevent the shaft from sliding during use. Advantageously, unlike single-use wire and cable ties, once the reusable clamping device is used, it may be easily removed from the machine and re-used on a different machine or for a different clamping or fastening purpose.

Figure 1:
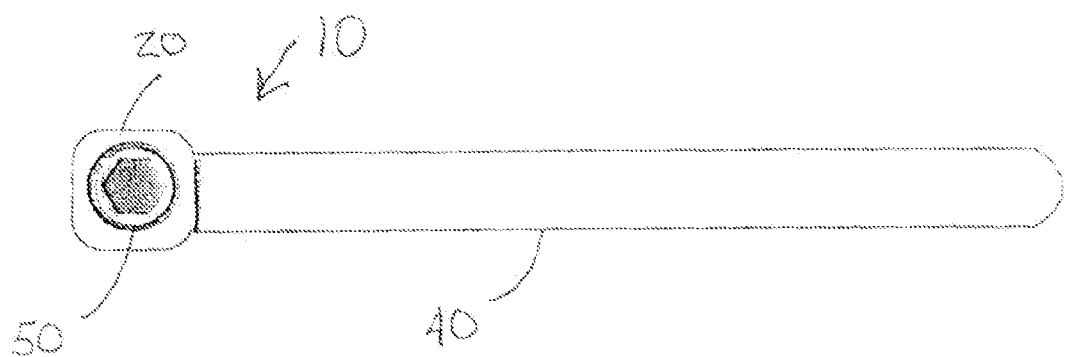
FIG. 1 is a top view of a clamp associated with a plastic cylinder forming one aspect of the disclosure.
Figure 2:
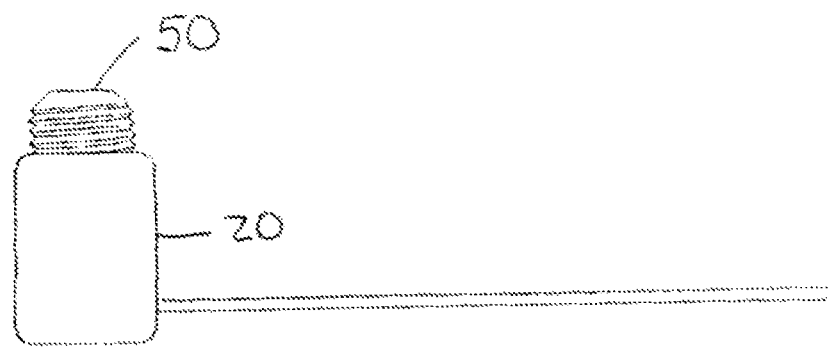
FIG. 2 is a side view of the clamp associated with the plastic cylinder forming one aspect of the disclosure.
Figure 3:
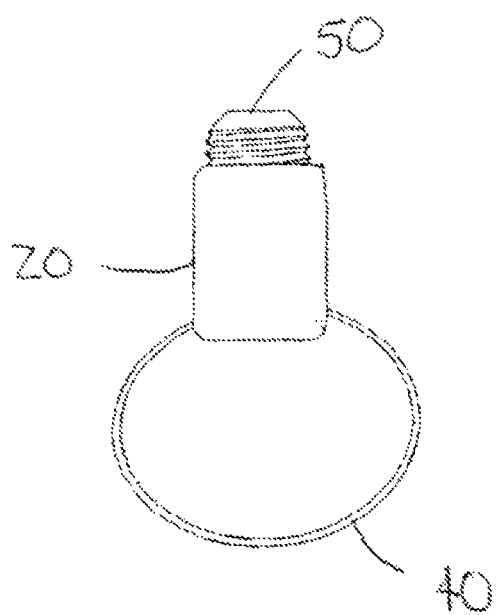
FIG. 3 is a side view of the clamp associated with the plastic cylinder formed as a loop forming one aspect of the disclosure.

Turning to FIG. 1, the reusable clamping device includes a cylinder 20. The cylinder may be made of plastic or another suitable rigid, yet relatively flexible material. As perhaps best shown in FIG. 6, the cylinder 20 includes an opening 30, such as a slot on the exterior portion of the cylinder. A plastic loop 40 may be connected to the cylinder 20 at one end and the opposite end of the loop may be inserted into the opening or slot 30. The plastic loop 40 may be made of 0.125 inch thick plastic. The opposite end of the loop may be trimmed and the corner may be rounded or tapered such that it fits tight and snugly within the slot 30. The opening or slot 30 is slightly larger than the loop such that a tight fit is ensured. The top of the inserted end of the loop (with the tapered end) fits right under the attached end of the loop. In order to tighten the device, a person may use his/her hands or even a tighter fit is desired, a pair of round tip vise grips may be used.

The device 10 further includes a screw 50 may be inserted inside the cylinder 20. The screw 50 may be a recessed, hex head screw that will be countersunk into the clamp when tightened. Although other types of screws may be used, the recessed hex head screw effectively grips the plastic of the cylinder when it is tightened. In more detail, the hex head screw is easy to tighten with one hand while gripping the clamp tight with the other hand. When tightened, the hex head screw is totally inside the base to eliminate the possibility of anything snagging or catching on it. The hex head screw also has a ring on the bottom of it which will grip tighter on the loop to prevent the loop from slipping back out. The interior portion of the cylinder 20 may be threaded such that it mates with the screw 50 when the screw is inserted.

Figure 4B:
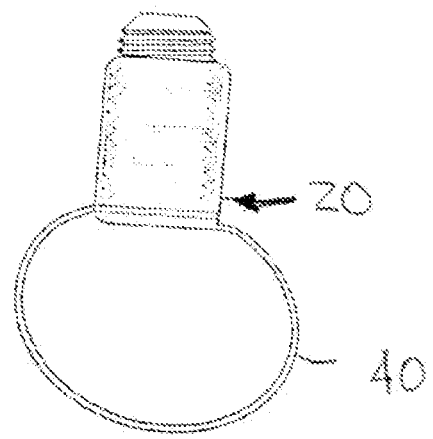
FIGS. 4a-4c are various cutaway views of the clamp associated with the plastic cylinder wherein the end of the loop fitting into the cylinder above the attached end of the loop forming one aspect of the disclosure.
Figure 4C:
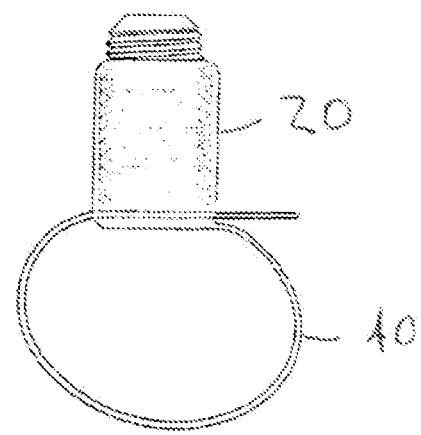
Figure 4A:
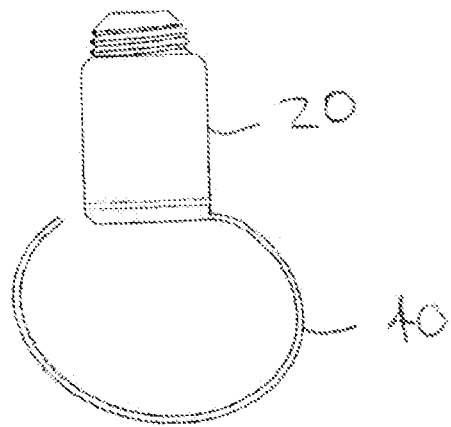
Figure 5B:
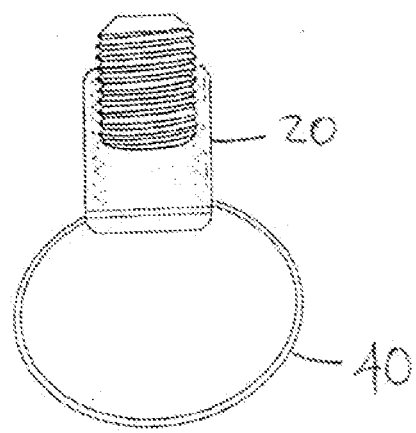
FIGS. 5a-5c are various cutaway views of the clamp associated with the plastic cylinder wherein the end of the loop fitting into the cylinder below the attached end of the loop forming one aspect of the disclosure.
Figure 5C:
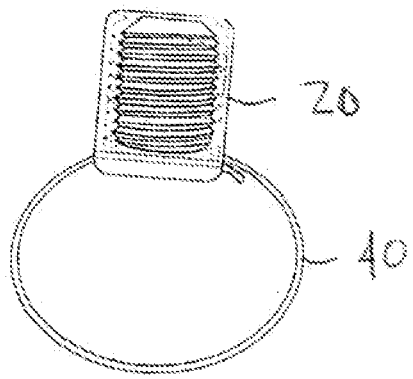
Figure 5A:
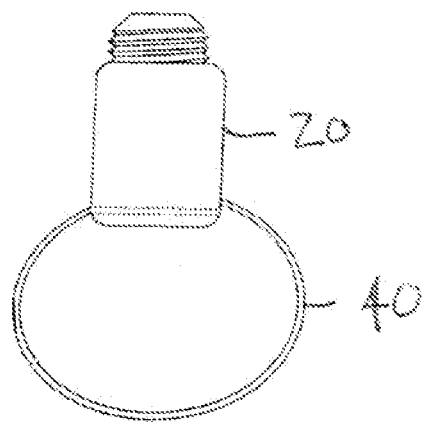
Figure 6:
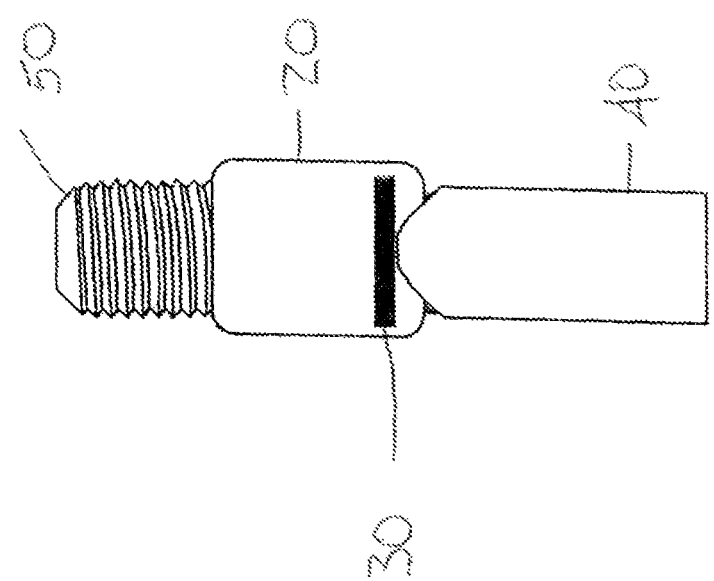
FIG. 6 is a front view of the clamp associated with the plastic cylinder including the opening for the loop forming one aspect of the disclosure.
Figure 7:
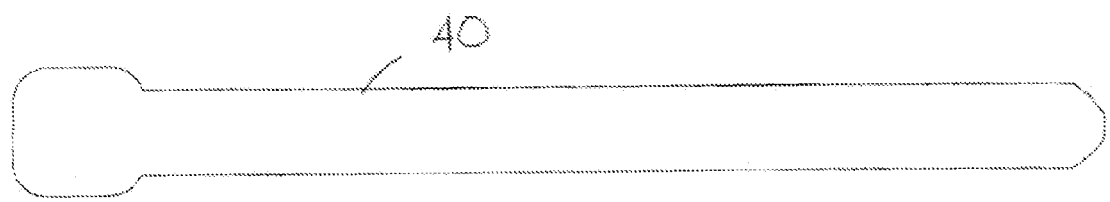
FIG. 7 is a bottom view of the clamp with the associated cylinder being in an unwrapped position forming one aspect of the disclosure.
Figure 8:
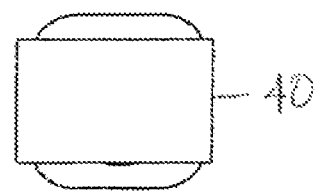
FIG. 8 is a bottom view of the clamp with the associated cylinder being in a wrapped position forming one aspect of the disclosure.

In use, the clamping device 10 including a screw 50, such as a recessed hex head screw and cylinder including slot and an associated loop may be used for multiple applications, including as a hose clamp or a binding device. The method of using the clamping device includes inserting the recessed hex head screw into the plastic cylinder and tightening the recessed hex head screw. The method further includes wrapping the associated loop around the item to be clamped. Once the associated loop is wrapped around the item, one end of the associated loop (the tapered end) is inserted into the slot on the cylinder. If desired, a person may loosen the recessed hex head screw such that the recessed hex head screw and the plastic cylinder may be removed from the item and reused. As shown in FIGS. 4a-4c, the free end of the loop fits into the cylinder above the attached end of the loop. Alternatively, in FIGS. 5a-5c, the free end of the loop may fit into the cylinder below the attached end of the loop.

Advantageously, the clamping device may be used temporarily or as a substantially permanent binding. Unlike wire tires, the clamping device may be easily loosened and unfastened, so that it may be reused. For example, many times a person may decide that the item being clamped needs moved or re-positioned and the clamping device may be easily loosened and unfastened such that the item may be moved to a more suitable location.

The foregoing descriptions of various embodiments are provided for purposes of illustration, and are not intended to be exhaustive or limiting. Modifications or variations are also possible in light of the above teachings. The embodiments described above were chosen to provide the best application to thereby enable one of ordinary skill in the art to utilize the disclosed inventions in various embodiments and with various modifications as are suited to the particular use contemplated. All such modifications and variations are within the scope of the invention.

The invention claimed is:

1. A clamping device, comprising:
a cylinder, wherein the cylinder has an opening and a threaded interior portion communicating with said opening;
a plastic loop connected to the cylinder at a first end and inserted into the opening of the cylinder at a second, distal end, wherein said loop is wrapped around an item to be clamped; and
a screw insertable into the cylinder to engage the plastic loop, whereby the screw is fastened into the threaded interior portion of the cylinder such that said screw may be tightened and loosened for re-use of the plastic loop.

2. The device according to claim 1, wherein the cylinder is plastic.

3. The device according to claim 1, wherein the opening is a slot.

4. The device according to claim 3, wherein the loop is configured to wrap around the cylinder.

5. The device according to claim 1, wherein the second, distal end of the plastic loop is tapered.

6. The device according to claim 1, wherein the screw is a hex head screw.

7. The device according to claim 1, wherein the screw is a recessed hex head screw.

8. The device according to claim 1, wherein the plastic loop is 0.125 inches thick.

9. The clamping device of claim 1, wherein the screw has a first tightened position and a second loosened position and whereby the screw is configured to project into the opening of the cylinder in the first tightened position.

10. The clamping device of claim 9, wherein the screw engages the loop in the first tightened position when the clamping device is in use.

11. The clamping device of claim 10, wherein the screw disengages the loop in the second loosened position.

12. A reusable fastening or binding device, comprising:
a plastic cylinder having a threaded interior portion and a slot positioned on an exterior portion, wherein the threaded interior portion is in communication with the slot;
a hex head screw insertable within the plastic cylinder; and
a plastic loop having a first attached end connected to the plastic cylinder and a second free end inserted into the slot such that the plastic loop is engaged by the hex head screw in a tightened position and released by the hex head screw in a loosened position.

13. A method of clamping or fastening an item, comprising:
providing a recessed hex head screw;
providing a plastic cylinder including slot and an associated loop;

inserting the recessed hex head screw into the plastic cylinder;
wrapping the associated loop around the item;
inserting a distal end of the associated loop into the slot on the cylinder; and
tightening the recessed hex head screw to engage the associated loop.

14. The method of claim 13, further comprising loosening the recessed hex head screw such that said recessed hex head screw and the plastic cylinder may be removed from the item and reused.

\* \* \* \* \*